R. C. WHITEHEAD.
DISK CULTIVATOR ATTACHMENT.
APPLICATION FILED JUNE 21, 1917.
1,258,287.
Patented Mar. 5, 1918.
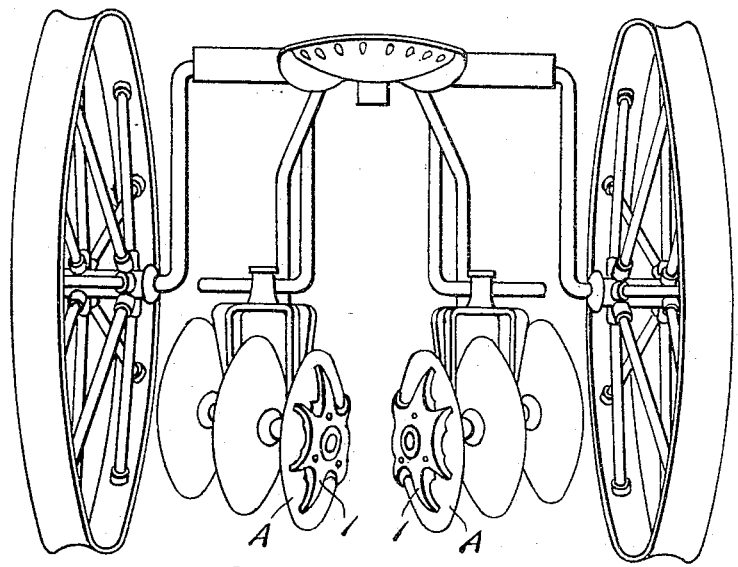
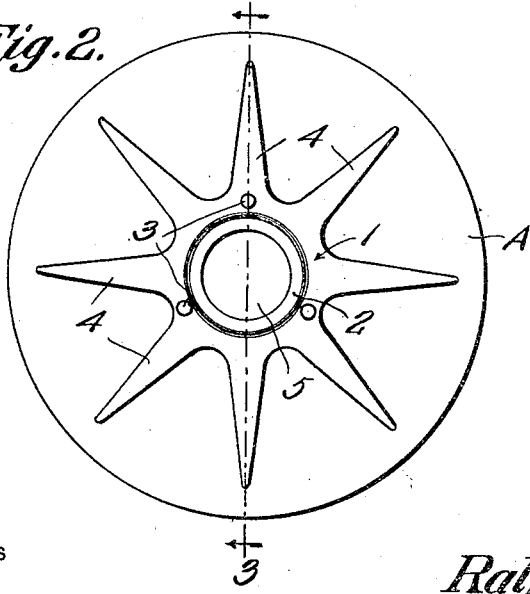
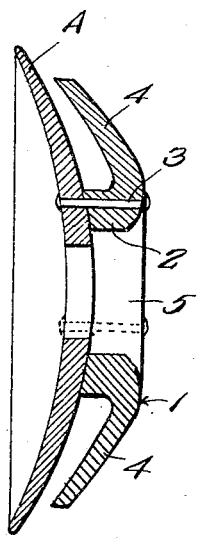
WITNESSES
James F. Crown
Wm. H. Milligan
INVENTOR
Ralph C. Whitehead,
BY Richard Owen,
ATTORNEY

UNITED STATES PATENT OFFICE.

RALPH C. WHITEHEAD, OF HAMILTON, OHIO.

DISK-CULTIVATOR ATTACHMENT.

1,258,287.  Specification of Letters Patent.  Patented Mar. 5, 1918.

Application filed June 21, 1917. Serial No. 176,211.

*To all whom it may concern:*

Be it known that I, RALPH C. WHITEHEAD, a citizen of the United States, residing at Hamilton, in the county of Butler and State of Ohio, have invented certain new and useful Improvements in Disk-Cultivator Attachments, of which the following is a specification.

This invention relates to a disk cultivator attachment, and the primary object is to provide a device for coöperating with the cultivator disks when used for cultivating corn and the like, whereby the soil directly adjacent the growing corn may be worked to eliminate the hard crust generally left after the ordinary cultivator has worked the soil on each side of the corn hill.

The invention aims to provide a pair of supplemental pronged disks carried by the inner cultivator disk of each gang, whereby both of the pronged disks will operate in unison to agitate the earth directly adjacent the growing corn.

Another object of the invention is to provide an attachment of this character that may be easily attached or detached without altering or interfering in any manner with the supports for the cultivator disks.

A further object of this invention is the provision of a disk cultivator attachment which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which;

Figure 1 is a rear view of an ordinary disk cultivator, showing my invention applied thereto.

Fig. 2 is an end elevation of one gang showing the device applied to the innermost disk of the gang.

Fig. 3 is a section on the line 3—3 of Fig. 2.

Referring to the drawing, wherein is illustrated the preferred form of my invention, and in which like numerals of reference indicate corresponding parts throughout the several views, the ordinary adjustable reversible disk cultivator, as shown particularly in Fig. 1 of the drawing has two gangs adapted to be moved close together when desired for cultivating corn or the like. It has been found that the innermost disks of the gangs should be moved together, so that they are approximately 14½ inches apart when cultivating a row of corn. It will be obvious that this manner of using the cultivator causes a strip of uncultivated earth to be left by the cultivator and this strip will eventually become hard and so thoroughly baked by the sun that the growth of the corn is impeded.

My invention, therefore, contemplates mounting a pronged disk 1 on the outer curved face of the innermost disk A in the gang. Referring particularly to Figs. 2 and 3 of the drawing, it will be observed that the pronged disk 1 includes the central hub portion 2 having one end engaged with the curved surface of the cultivator disk, the end of the hub being shaped to fit the curve. Three holes are then drilled in the disk A, and rivets or bolts 3 are extended through the holes and other openings in the hub as clearly shown by Fig. 3 of the drawing. This retains the pronged disk in position.

Extending radially from the hub is a plurality of prongs 4 which are in the nature of tapered fingers terminating in close proximity to the marginal cutting edge of the disk. The prongs or fingers 4 are also curved toward the curved face of the disk, so that their terminals are closer to the surface of the disk than are the opposite ends, so that small stones, roots and the like will be prevented from working between the prongs and the disk. The prongs or fingers, however, are spaced sufficiently away from the disk to permit them to extend into the ground as the disk rotates, so that the earth not touched by the disks will be agitated by the prongs or fingers 4. It will be apparent, that the fingers may be disposed at any desired angle, so that they may be caused to work up close to the growing corn, and thereby loosen the earth around the same.

The central portion of the hub has a large opening 5 for receiving the projecting ends of the shafts upon which the disks of the cultivator are mounted, thus preventing the possibility of the pronged disk interferring with any variance in the construction of the cultivator itself.

From the foregoing it will be observed that a very simple and durable disk cultivator attachment has been provided, the details of which embody the preferred form.

I desire it to be understood, however, that slight changes in the minor details of construction may be made without departing from the spirit of the invention or the scope of the claims hereunto appended.

I claim:

1. In a cultivator disk attachment, the combination of a dished cultivator disk, a hub curved to fit the curved face of the said dished disk, and a plurality of prongs radiating from the hub and lying in close proximity to the curved surface of the dished disk.

2. In a disk cultivator attachment, the combination of a dished cultivator disk, a hub having its end curved to fit the center of the said dished disk and a plurality of prongs formed with the hub at a point slightly spaced from the said curved end thereof, the said prongs being curved and having their terminals extended into close proximity to the curved surface of the said dished disk.

In testimony whereof I affix my signature in presence of two witnesses.

RALPH C. WHITEHEAD.

Witnesses:
GRACE L. RYBOLT,
WALTER W. BOWERS.

Copies of this patent may be obtained for five cents each, by addressing the "Commissioner of Patents, Washington, D. C."